US008428834B2

(12) United States Patent
Takahashi et al.

(10) Patent No.: US 8,428,834 B2
(45) Date of Patent: Apr. 23, 2013

(54) CONTROL SYSTEM OF AUTOMATIC TRANSMISSION

(75) Inventors: Seiichiro Takahashi, Isehara (JP); Masato Koga, Hiratsuka (JP); Masaaki Uchida, Yokosuka (JP); Tatsuo Ochiai, Kanagawa (JP); Ryoji Kadono, Kawasaki (JP); Tateki Jozaki, Yokohama (JP); Hideaki Suzuki, Yokohama (JP); Ryousuke Nonomura, Kawasaki (JP); Mamiko Inoue, Machida (JP)

(73) Assignees: Nissan Motor Co., Ltd., Yokohama-shi (JP); Jatco Ltd, Fuji-shi (JP)

( * ) Notice: Subject to any disclaimer, the term of this patent is extended or adjusted under 35 U.S.C. 154(b) by 510 days.

(21) Appl. No.: 12/712,437

(22) Filed: Feb. 25, 2010

(65) Prior Publication Data
US 2010/0228449 A1 Sep. 9, 2010

(30) Foreign Application Priority Data

Mar. 6, 2009 (JP) ................................. 2009-054008

(51) Int. Cl.
*G06F 7/00* (2006.01)
(52) U.S. Cl.
USPC .......................................................... 701/51
(58) Field of Classification Search .................. 701/51, 701/53, 64, 87
See application file for complete search history.

(56) References Cited

U.S. PATENT DOCUMENTS

| 4,653,351 A | 3/1987 | Downs et al. |
| 4,672,863 A | 6/1987 | Itoh et al. |
| 6,182,000 B1 | 1/2001 | Ohta et al. |
| 6,377,882 B1 | 4/2002 | Ito |
| 6,855,085 B1 | 2/2005 | Gumpoltsberger |
| 7,384,375 B2 | 6/2008 | Yamada et al. |
| 7,563,196 B2 | 7/2009 | Yamada et al. |
| 7,563,197 B2 | 7/2009 | Ayabe et al. |
| 7,771,316 B2 | 8/2010 | Honma et al. |
| 7,822,524 B2 | 10/2010 | Tabata et al. |
| 2001/0044683 A1* | 11/2001 | Takaoka et al. .................. 701/22 |

(Continued)

FOREIGN PATENT DOCUMENTS

| EP | 0 410 451 A2 | 1/1991 |
| EP | 806 592 A2 | 11/1997 |

(Continued)

OTHER PUBLICATIONS

Takahashi et al., USPTO Non-Final Office Action, U.S. Appl. No. 12/712,440, Nov. 3, 2011, 18 pgs.

(Continued)

*Primary Examiner* — Kim T Nguyen
(74) *Attorney, Agent, or Firm* — Foley & Lardner LLP

(57) ABSTRACT

A control system of an automatic transmission including a stepwise variable transmission section and a continuously variable transmission section makes a speed change control of the continuously variable transmission section cooperate with a change of an input rotation speed of the stepwise variable transmission section and is configured to judge, during the shift change of the stepwise variable transmission section, whether a delivery of a torque from one of a plurality of disengaging side frictional elements to one of a plurality of engaging side frictional elements is completed, and to start the speed change control of the continuously variable transmission section upon judgment that the delivery of the torque is completed and that an inertial phase has started.

11 Claims, 11 Drawing Sheets

U.S. PATENT DOCUMENTS

| | | |
|---|---|---|
| 2002/0035013 A1 | 3/2002 | Saito |
| 2005/0272555 A1* | 12/2005 | Tabata et al. ............... 477/2 |
| 2006/0154780 A1 | 7/2006 | Ayabe et al. |
| 2007/0093358 A1 | 4/2007 | Atsushi et al. |

FOREIGN PATENT DOCUMENTS

| | | |
|---|---|---|
| EP | 0 959 270 A2 | 11/1999 |
| JP | 61-105361 A | 5/1986 |
| JP | 5-079554 A | 3/1993 |
| JP | 5-240335 A | 9/1993 |
| JP | 6-129528 A | 5/1994 |
| JP | 8-285064 A | 11/1996 |
| JP | 8-291858 A | 11/1996 |
| JP | 10-331962 A | 12/1998 |
| JP | 10-331963 A | 12/1998 |
| JP | 11-37267 A | 2/1999 |
| JP | 11-141675 A | 5/1999 |
| JP | 11-182663 A | 7/1999 |
| JP | 2000-205398 A | 7/2000 |
| JP | 2003-42284 A | 2/2003 |
| JP | 2003-314681 A | 11/2003 |
| JP | 2004-316811 A | 11/2004 |
| JP | 2006-348985 A | 12/2006 |
| JP | 2007-92665 A | 4/2007 |
| JP | 2007-225048 A | 9/2007 |
| JP | 2007-263206 A | 10/2007 |

OTHER PUBLICATIONS

U.S. Appl. No. 12/712,429, filed Feb. 25, 2010, Takahashi et al.
U.S. Appl. No. 12/712,440, filed Feb. 25, 2010, Takahashi et al.
U.S. Appl. No. 12/712,448, filed Feb. 25, 2010, Takahashi et al.
U.S. Appl. No. 12/712,454, filed Feb. 25, 2010, Takahashi et al.
S. Takahashi et al., US PTO Notice of Allowance, U.S. Appl. No. 12/712,440, dated May 9, 2012, (8 pgs.).
S. Takahashi et al., US Notice of Allowance on U.S. Appl. No. 12/712,454, DTD Sep. 27, 2012, 13 pgs.
S. Takahashi et al., US Non-Final Office Action, U.S. Appl. No. 12/712,448, dated Jul. 24, 2012, (18 pgs.).
Chinese Office Action dated Jul. 4, 2012, (12 pgs.).
S. Takahashi et al., US Final Office Action, U.S. Appl. No. 12/712,448, dated Nov. 14, 2012, (8 pgs.).
S. Takahashi et al., US Notice of Allowance, U.S. Appl. No. 12/712,429, dated Nov. 23, 2012, (48 pgs.) (with 21 US references).
S. Takahashi et al., US Notice of Allowance, U.S. Appl. No. 12/712,448, dated Feb. 21, 2013, (9 pgs.).

* cited by examiner

[NOT UNDER SHIFT CHANGE OR PREPARATION PHASE]

[DURING SHIFT CHANGE (TORQUE PHASE, INERTIAL PHASE)]

CONTROL SYSTEM OF AUTOMATIC TRANSMISSION

BACKGROUND OF THE INVENTION

1. Field of the Invention

The present invention relates in general to control systems of an automatic transmission that has both a continuously variable transmission section and a stepwise variable transmission section, and more particularly to the control systems of a type that, upon need of a speed change of the automatic transmission, makes a control of the continuously variable transmission section cooperate with that of the stepwise variable transmission section thereby to achieve a quite smoothed speed change of the transmission as if the speed change is like a continuously variable speed change. More specifically, the present invention is concerned with the control systems of a type that, upon need of a speed change of the automatic transmission, makes the control of the continuously variable transmission section cooperate with a so-called "change-over shift change" of the stepwise variable transmission section. The change-over shift change means a speed change or shift change that is effected by disengaging one frictional element that has been kept engaged and engaging the other frictional element that has been kept disengaged. Such change-over shift change is sometimes called "replacement of gear shift".

2. Description of the Related Art

One of the control systems of the above-mentioned type is disclosed in Japanese Laid-open Patent Application (Tokkaihei) 5-079554. In the control system of this publication, a technique is practically used for carrying out a cooperative control of the continuously variable transmission section during the change-over shift change of the stepwise variable transmission section, more specifically, in an inertia phase of the change-over shift change of the stepwise variable transmission section. That is, for suppressing or at least minimizing undesired shift shock that would be caused by a poor cooperative control of the continuously variable transmission section, starting of the inertia phase is detected or judged based on a change of input rotation speed of the stepwise variable transmission section.

SUMMARY OF THE INVENTION

However, for avoiding erroneous judgment or detection that would be caused by disturbance or noises, the above-mentioned technique carries out the judgment or detection of starting of the inertia phase only when the change of input rotation speed exceeds a predetermined level. That is, in the above-mentioned technique, until the time when the change of the input rotation speed exceeds the predetermined level, judgment or detection of the starting of the inertia phase is not carried out. Accordingly, in a control system that employs the above-mentioned technique, it tends to occur that, due to presence of non-judgment period, a delay in timing of controlling the continuously variable transmission section is induced relative to the starting of the inertia phase, which brings about a shift shock that is caused by the change of input rotation speed of the stepwise variable transmission section.

Accordingly, it is an object of the present invention to provide a control system of an automatic transmission, which is free of the above-mentioned shortcoming.

That is, in the present invention, in order to make a continuously variable transmission section carry out a cooperative control in synchronization with a change of input rotation speed of a stepwise variable transmission section, completion of delivery of a torque from a disengaging side frictional element to an engaging side frictional element during a speed change operation (or change over shift change) of the stepwise variable transmission section is practically used for the judgment or detection of starting of the inertia phase of the change-over shift change (viz., shift change operation) of the stepwise variable transmission section and, upon completion of such torque delivery, the control of the continuously variable transmission section is started.

Accordingly, in the present invention, the timing of starting the control of the continuously variable transmission section is synchronized with the timing of starting of the inertia phase of the change-over shift change of the stepwise variable transmission section. Thus, undesired shift shock, which would be caused by a change of the input rotation speed of the stepwise variable transmission section, is suppressed or at least minimized.

In accordance with a first aspect of the present invention, there is provided a control system of an automatic transmission, the automatic transmission including a stepwise variable transmission section that includes a plurality of frictional elements and establishes a desired speed by a shift change disengaging one of the frictional elements and engaging the other of the frictional elements and a continuously variable transmission section that establishes a desired speed continuously, the control system making a speed change control of the continuously variable transmission section cooperate with a change of an input rotation speed of the stepwise variable transmission section, the control system being configured to carry out during the shift change of the stepwise variable transmission section, judging whether a delivery of a torque from a disengaging side frictional element to an engaging side frictional element is completed or not; and starting the speed change control of the continuously variable transmission section upon judgment of the completion of the delivery of the torque regarding that an inertial phase has started.

In accordance with a second aspect of the present invention, there is provided a control system of an automatic transmission, the automatic transmission including a stepwise variable transmission section that includes a plurality of frictional elements and establishes a desired speed by a shift change disengaging one of the frictional elements and engaging the other of the frictional elements and a continuously variable transmission section that establishes a desired speed continuously, the control system making a speed change control of the continuously variable transmission section cooperate with a change of an input rotation speed of the stepwise variable transmission section, the control system comprising means that, during the shift change of the stepwise variable transmission section, carries out judgment as to whether a delivery of a torque from a disengaging side frictional element to an engaging side frictional element is completed or not; and means that starts the speed change control of the continuously variable transmission section upon judgment of the completion of the delivery of the torque regarding that an inertial phase has started.

In accordance with a third aspect of the present invention, there is provided a method of controlling an automatic transmission, the automatic transmission including a stepwise variable transmission section that includes a plurality of frictional elements and establishes a desired speed by a shift change disengaging one of the frictional elements and engaging the other of the frictional elements and a continuously variable transmission section that establishes a desired speed continuously, the continuously variable transmission section being controlled in cooperation with a change of an input rotation speed of the stepwise variable transmission section, the method comprising judging, during the shift change of the stepwise variable transmission section, whether a delivery of a torque from a disengaging side frictional element to an engaging side frictional element is completed or not; and starting the control of the continuously variable transmission section upon judgment of the completion of the delivery of the torque regarding that an inertial phase has started.

BRIEF DESCRIPTION OF THE DRAWINGS

Other objects and advantages of the present invention will become apparent from the following description when taken in conjunction with the accompanying drawings, in which:

FIGS. 9A and 9B are time charts respectively provided by the present invention and a comparison example, in which FIG. 9A depicts control flows provided when a cooperative speed change control is carried out upon judgment of starting of the inertia phase in accordance with the present invention, and FIG. 9B depicts control flows provided when a cooperative speed change control is carried out upon judgment of starting of the inertia phase in accordance with the comparison example, the comparison example being based on an input rotation speed $Ni_{(AT)}$ of the stepwise variable transmission section for the judgment;

DETAILED DESCRIPTION OF THE INVENTION

In the following, a control system of an automatic transmission according to the present invention will be described in detail with reference to the accompanying drawings.

Figure 1:
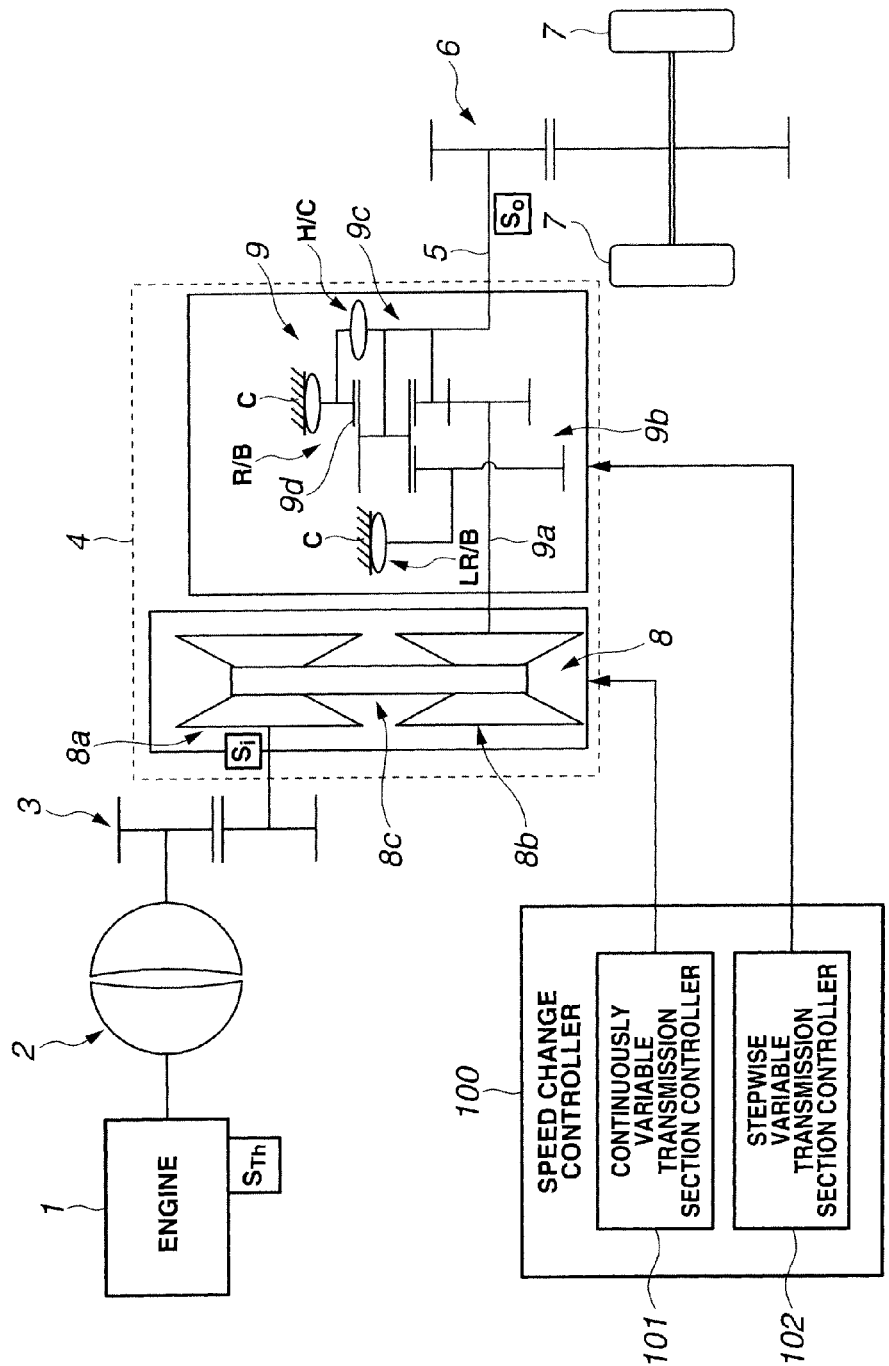
FIG. 1 is a schematic diagram of a power train including an automatic transmission to which a control system of the present invention is practically applied, the automatic transmission including a continuously variable transmission section and a stepwise variable transmission section.

Referring to FIG. 1, there is shown a power train including an automatic transmission to which the control system of the present invention is practically applied.

As shown in the drawing, the power train comprises an engine 1 that is a prime mover, a torque converter 2 that is operatively connected to engine 1, an automatic transmission 4 that is operatively connected to torque converter 2 through a speed reduction mechanism 3, a final drive gear mechanism 6 that is connected to automatic transmission 4 through an output shaft (or propeller shaft) 5 of the transmission 4, and driven road wheels 7 that are operatively connected to final drive gear mechanism 6.

As shown, automatic transmission 4 is of a double transmission type including a continuously variable transmission section 8 and a stepwise variable transmission section (or sub-transmission section) 9.

Continuously variable transmission section 8 comprises a drive pulley 8a that is operatively connected to an output shaft of speed reduction mechanism 3, a driven pulley 8b that is operatively connected to an input shaft 9a of stepwise variable transmission section 9, and an endless belt 8c that is operatively put around the drive and driven pulleys 8a and 8b. That is, the continuously variable transmission section 8 is of a belt-type continuously variable transmission.

Although not shown in the drawing, known hydraulic actuators are provided to both the drive and driven pulleys 8a and 8b for controlling a thickness of each pulley 8a or 8b, more specifically, a width of a belt receiving groove defined by each pulley 8a or 8b. Thus, by controlling a hydraulic pressure fed to the hydraulic actuators, continuously variable transmission section 8 carries out a continuously variable transmission between drive and driven pulleys 8a and 8b.

Stepwise variable transmission section 9 is a sub-transmission section that comprises a ravigneaux type planetary gear mechanism. That is, as shown in the drawing, a compound sun gear 9b of the ravigneaux type planetary gear mechanism is connected through input shaft 9a to driven pulley 8b to be driven by the same, and a pinion carrier 9c of the mechanism is connected to output shaft 5 to drive the same. Thus, compound sun gear 9b serves as an input member and pinion carrier 9c serves as an output member. Compound sun gear 9b is connected to a case C through a low & reverse brake LR/B (viz., brake for selecting first speed) and pinion carrier 9c is connected to a ring gear 9d through a high clutch H/C (viz., clutch for selecting second speed). Ring gear 9d is connected to case C through a reverse brake R/B.

Low & reverse brake LR/B, high clutch H/C and reverse brake R/B are respectively provided with hydraulic actuators, so that ON/OFF condition (viz., engaged/disengaged condition) of these frictional elements LR/B, H/C and R/B is controlled by a hydraulic pressure fed to such actuators. Thus, by controlling the hydraulic pressure fed to the hydraulic actuators, stepwise variable transmission section 9 is able to establish a forward $1^{st}$ speed, a forward $2^{nd}$ speed and a reverse.

For establishing the forward $1^{st}$ speed, low & reverse brake LR/B is engaged and at the same time, high clutch H/C is disengaged (or released). For establishing the forward $2^{nd}$ speed, low & reverse brake LR/B is disengaged (or released) and at the same time, high clutch H/C is engaged.

More specifically, in case of establishing the forward $1^{st}$ speed, low & reverse brake LR/B is engaged, high clutch H/C is disengaged (or released) and reverse brake RIB is disengaged. In case of establishing the forward $2^{nd}$ speed, low & reverse brake LR/B is disengaged (or released), high clutch H/C is engaged and reverse brake R/B is disengaged. In case of establishing the reverse, low & reverse brake LR/B is engaged, high clutch H/C is disengaged (or released) and reverse brake R/B is engaged.

As is seen from FIG. 1, automatic transmission 4 is controlled by a speed change controller 100. Speed change controller 100 comprises a continuously variable transmission section controller 101 that controls continuously variable transmission section 8 and a stepwise variable transmission section controller 102 that controls stepwise variable transmission section 9.

By the controller 101, the target automatic transmission input rotation speed $N_{i(O)}$ (which is the target input rotation speed of the automatic transmission 4) is calculated and based on this target automatic transmission input rotation speed $N_{i(O)}$ thus calculated, a transmission ratio (or continuously variable side ratio) $Ra_{(CVT)}$ of continuously variable transmission section 8 is continuously controlled, and by the other controller 102, a target speed (or target gear) of stepwise variable transmission section 9 is calculated and based on this target speed thus calculated, a transmission ratio of stepwise variable transmission section 9 is controlled.

That is, in the entire construction of the automatic transmission 4, by making the speed control of continuously variable transmission section 8 cooperate with that of stepwise variable transmission section 9, a target or desired transmission ratio $I_O$ of the automatic transmission 4 is established.

Figure 2:
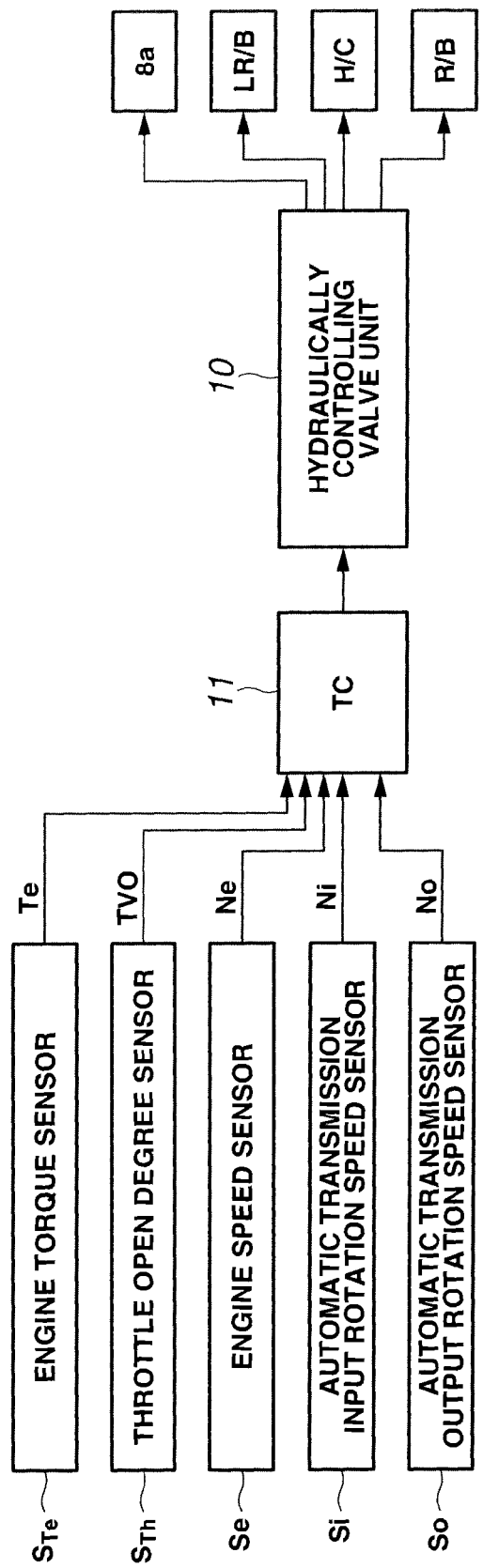
FIG. 2 is a block diagram schematically showing a control system of the present invention.

As is understood from FIG. 2, in continuously variable transmission section 8, by effecting ON/OFF control to solenoid valves installed in a hydraulically controlling valve unit 10, the hydraulic pressure fed to the hydraulic actuators of drive and driven pulleys 8a and 8b is controlled. Usually, only the hydraulic pressure fed to the hydraulic actuator of drive pulley 8a is controlled. With such control, the transmission ratio of the continuously variable transmission section 8 is continuously varied.

Like the above, also in stepwise variable transmission section 9, by effecting ON/OFF control to solenoid valves installed in hydraulically controlling valve unit 10, the hydraulic pressure fed to the hydraulic actuators of low & reverse brake LR/B, high clutch H/C and reverse brake R/B is controlled. With such control, the forward $1^{st}$ speed, forward $2^{nd}$ speed and the reverse are selectively established.

As is seen from FIG. 2, hydraulically controlling valve unit 10 is controlled by a transmission controller (TC) 11. Into transmission controller (TC) 11, there are inputted a signal Te from an engine torque sensor $S_{Te}$ that represents an engine torque $T_e$, a signal TVO from a throttle open degree sensor $S_{Th}$ that represents a throttle open degree TVO, a signal Ne from an engine speed sensor $S_e$ that represents a rotation speed (or engine speed) Ne of the engine 1, a signal Ni from an automatic transmission input rotation speed sensor Si that represents an input rotation speed (or automatic transmission input rotation speed) Ni of automatic transmission 4, and a signal No from an automatic transmission output rotation speed sensor So that represents a rotation speed (or automatic transmission output rotation speed) No of the automatic transmission output shaft 5.

Figure 3:
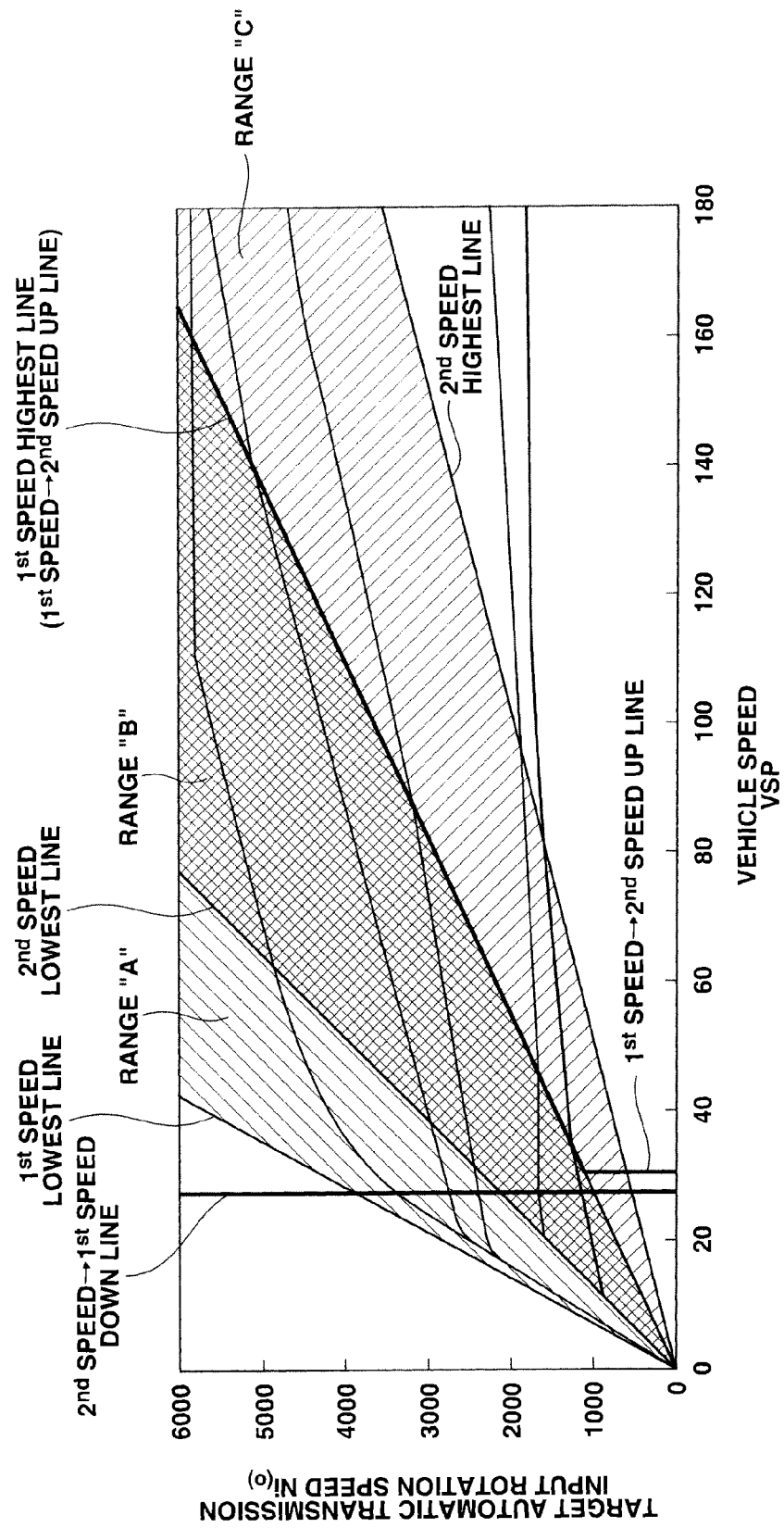
FIG. 3 is a shift map used for a control of the automatic transmission executed by the control system of the present invention.

Based on these information signals Te, TVO, Ne, Ni and No, transmission controller 11 carries out the following speed control to automatic transmission 4 with the aid of the shift map of FIG. 3. It is to be noted that the shift map of FIG. 3 is produced by practically combining a shift map of continuously variable transmission section 8 with that of stepwise variable transmission section 9.

As is seen from the shift map of FIG. 3, when stepwise variable transmission section 9 selects the forward $1^{st}$ speed, continuously variable transmission section 8 is able to have a speed varying range from $1^{st}$ speed lowest line to $1^{st}$ speed highest line. While, when stepwise variable transmission section 9 selects the forward $2^{nd}$ speed, continuously variable transmission section 8 is able to have a speed varying range from $2^{nd}$ speed lowest line to $2^{nd}$ speed highest line.

Accordingly, in the range "A" of the shift map, the speed control is possible only when stepwise variable transmission section 9 selects the forward $1^{st}$ speed. In the range "B" of the shift map, the speed control is possible not only when stepwise variable transmission section 9 selects the forward $1^{st}$ speed but also when the transmission section 9 selects the forward $2^{nd}$ speed, and in the range "C" of the shift map, the speed control is possible only when stepwise variable transmission section 9 selects the forward $2^{nd}$ speed.

In the ranges "A", "B" and "C", the target input rotation speed $N_{i(O)}$ of the automatic transmission 4, which is the target automatic transmission input rotation speed, is derived from the vehicle speed VSP and the throttle open degree TVO with reference to the shift map of FIG. 3, and continuously variable transmission section 8 is controlled in such a manner as to establish the target automatic transmission input rotation speed $N_{i(O)}$ thus derived. Accordingly, in continuously variable transmission section 8, the transmission ratio can be continuously varied. In this embodiment, hydraulically controlling valve unit 10 and transmission controller 11 constitute the continuously variable transmission section controller 101.

While, in the shift map of stepwise variable transmission section 9, a forward $1^{st}$ speed range and a forward $2^{nd}$ speed range are determined by "1→2 UP line" at which forward $1^{st}$ speed changes to forward $2^{nd}$ speed and "2→1 DOWN line" at which forward $2^{nd}$ speed changes to forward $1^{st}$ speed.

For example, when a cruising condition of an associated motor vehicle, that is determined by both vehicle speed VSP and throttle open degree TVO, is like a cruising condition that crosses the 1→2 UP line in a direction from a lower speed side toward a higher speed side, stepwise variable transmission section 9 is controlled to disengage low & reverse brake LR/B and engage high clutch H/C for selecting forward $2^{nd}$ speed.

While, when the cruising condition of the motor vehicle is like a cruising condition that crosses the 2→4 DOWN line in a direction from a higher speed side toward a lower speed side, stepwise variable transmission section 9 is controlled to disengage high clutch H/C and engage low & reverse brake LR/B for selecting forward $1^{st}$ speed. That is, in this embodiment, hydraulically controlling valve unit 10 and transmission controller 11 constitute not only the continuously variable transmission section controller 101 but also the stepwise variable transmission section controller 102.

With reference to the shift map of FIG. 3, stepwise variable transmission section 9 can select forward $1^{st}$ speed or forward $2^{nd}$ speed in accordance with the vehicle speed VSP and the throttle open degree TVO that are calculated, and at the same time, continuously variable transmission section 8 can carry out a continuously variable speed change in accordance with the vehicle speed VSP and the throttle open degree TVO.

In the automatic transmission 4, when the change-over shift change is effected by stepwise variable transmission section 9, the continuously variable speed change is synchronously effected by continuously variable transmission section 8. That is, a cooperative control (or cooperative speed change control) is practically carried out between the speed change control of continuously variable transmission section 8 and that of stepwise variable transmission section 9.

As will become much apparent as the description proceeds, the cooperative speed change control is practically employed in the present invention to achieve a quite smoothed speed change of the automatic transmission 4 as if the speed change of the transmission 4 is like a continuously variable speed change.

Figure 4:
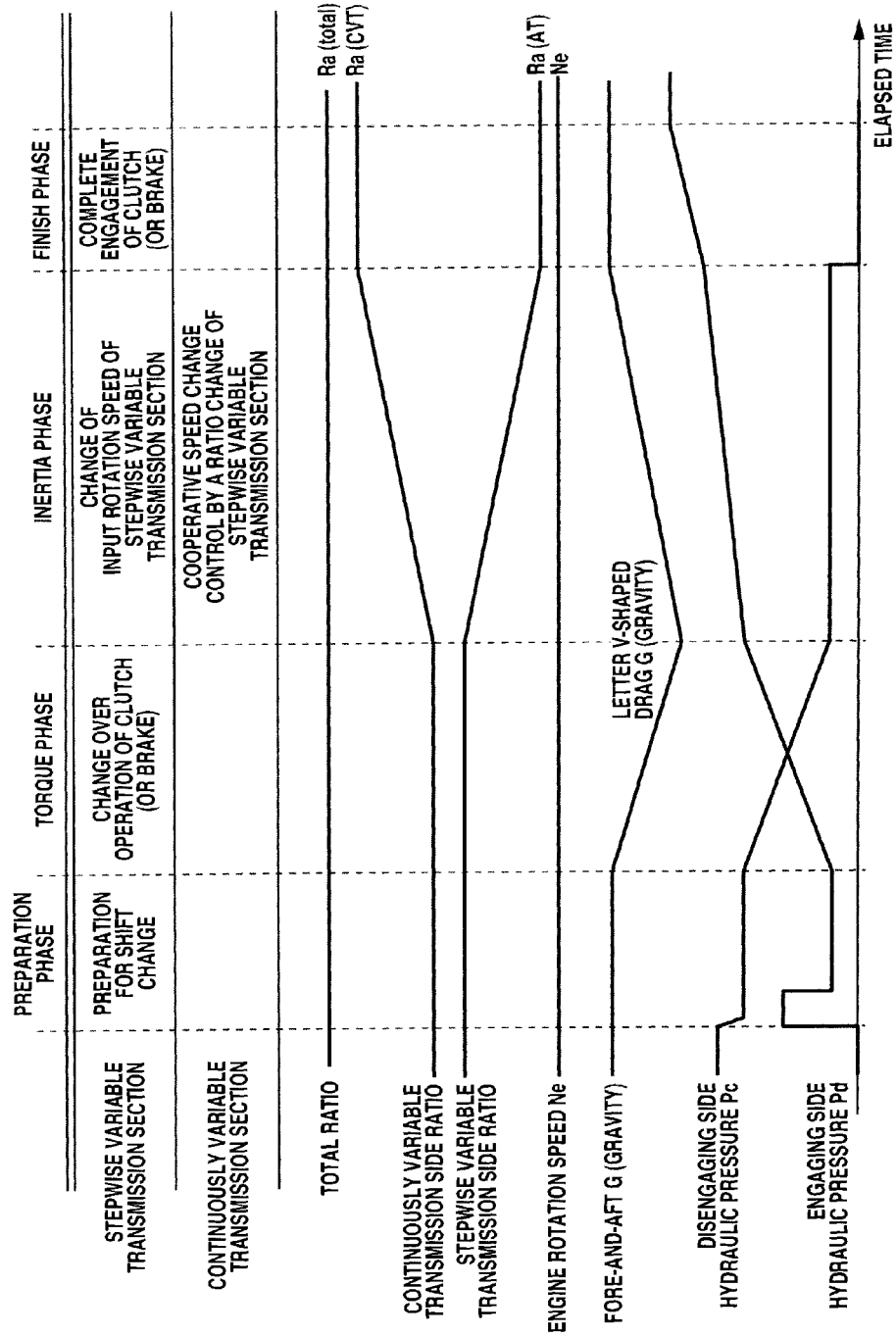
FIG. 4 is a time chart depicting in time series various conditions of the stepwise and continuously variable transmission sections with respect to four phases that are produced or appear during a change-over shift change of the stepwise variable transmission section.

That is, as is seen from the time chart of FIG. 4, in the cooperative speed change control, a fluctuation of transmission ratio $Ra_{(AT)}$ of stepwise variable transmission section 9, which is inevitably produced when a speed change is effected in the transmission section 9, is cancelled by a fluctuation of transmission ratio $Ra_{(CVT)}$ of continuously variable transmission section 8, which is inevitably produced when a speed change is effected in the transmission section 8. With such cancellation, the entire construction of the automatic transmission 4 carries out a quite smoothed speed change as if the transmission ratio $Ra_{(total)}$ (which will be referred to "total ratio" hereinafter) of the automatic transmission 4 has no fluctuation produced.

For ease of understanding, the transmission ratio $Ra_{(AT)}$ of stepwise variable transmission section 9 will be referred to a stepwise variable transmission side ratio, the transmission ratio $Ra_{(CVT)}$ of continuously variable transmission section 8 will be referred to a continuously variable transmission side ratio, and the transmission ratio $Ra_{(total)}$ of the entire construction of automatic transmission 4 will be referred to a total ratio.

For example, when the continuously variable transmission section 8 is subjected to a down-shift in synchronization with an up-shift of the stepwise variable transmission section 9 from the forward $1^{st}$ speed to the forward $2^{nd}$ speed, a speed change is smoothly carried out by the entire construction of automatic transmission 4 keeping the input rotation speed Ni thereof unchanged. That is, when the cooperative speed change control is practically applied to automatic transmission 4, undesired inertia torque and shift shock, which would be produced at an up-shift operation of stepwise variable transmission section 9, are suppressed or at least minimized, and thus, the speed change of the automatic transmission 4 is smoothly carried out as if the speed change is effected by only continuously variable transmission section 8.

As is described hereinabove, the entire construction of automatic transmission 4 is able to cover a large transmission ratio by the unit that comprises continuously variable transmission section 8 of which transmission ratio is continuously variable and stepwise variable transmission section 9 of which transmission ratio is stepwise variable.

More specifically, by using hydraulically controlling valve unit 10 and transmission controller (TC) 11 as control means, the entire construction of automatic transmission 4 including continuously variable transmission section 8 and stepwise variable transmission section 9 is able to cover a transmission ratio that is larger than that covered by either one of the two transmission sections 8 and 9.

In the change-over shift change effected by stepwise variable transmission section 9, there are two types of speed change, one being a speed change (or shift change) under Power ON condition and the other being a speed change (or shift change) under Power OFF condition. That is, in the speed change under Power ON condition, the input torque $T_{i(AT)}$ (which will be referred to stepwise variable transmission input torque hereinafter) of stepwise variable transmission section 9 exhibits such a positive value that the input side of stepwise variable transmission section 9 constitutes a drive side. While, in the speed change under Power OFF condition, the stepwise variable transmission input torque $T_{i(AT)}$ exhibits such a negative value that the output side of stepwise variable transmission section 9 constitutes a drive side.

As is described hereinabove, the change-over shift change is of a type of shift change wherein for effecting the shift change, one frictional element that has been kept engaged is disengaged (or released) and the other frictional element that has been kept disengaged (or released) is engaged.

Figure 5:
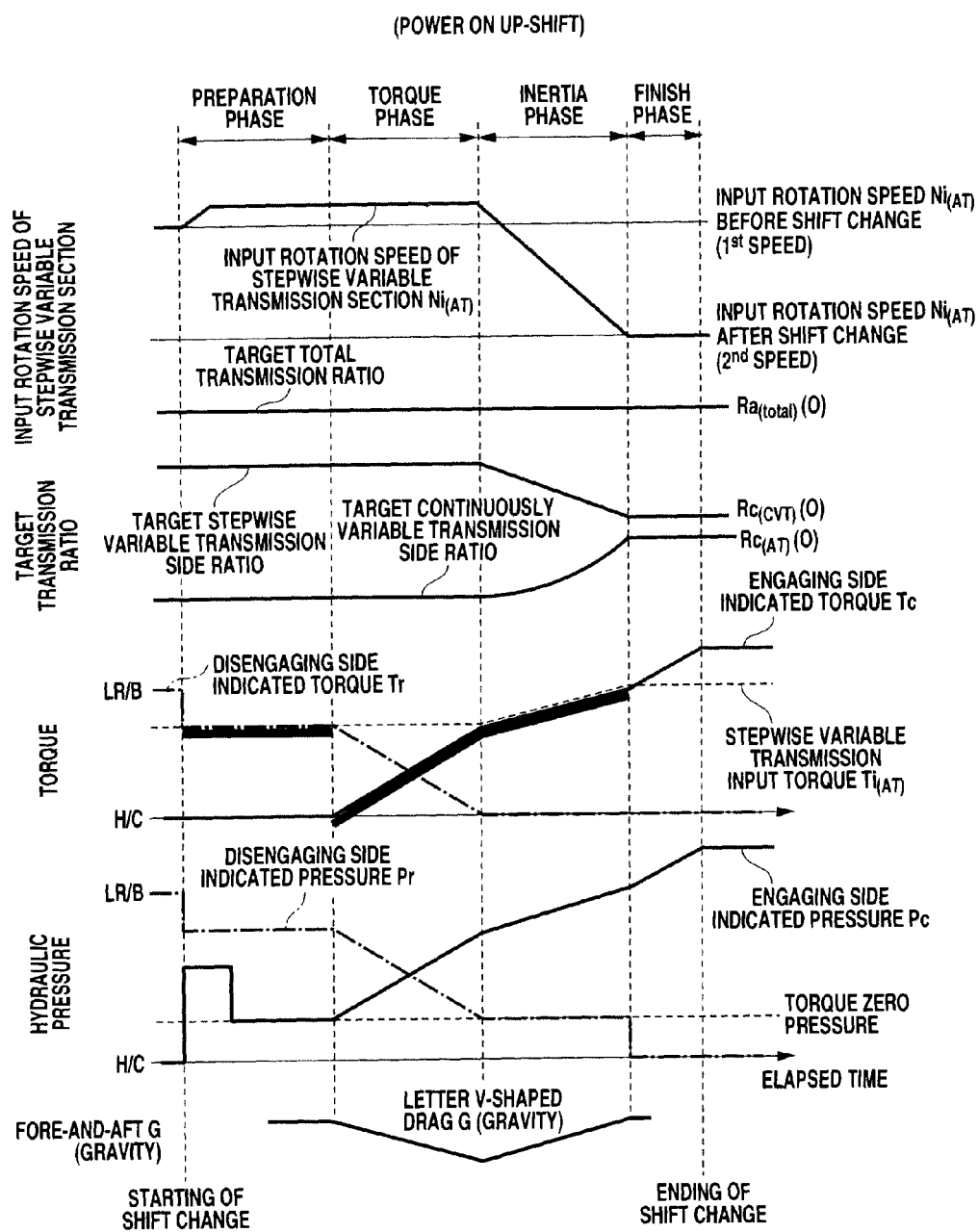
FIG. 5 is a time chart depicting in time series changes of various control factors for the continuously and stepwise variable transmission sections with respect to the four phases of the change-over shift change at the time of "Power On Up-shift" operation.

For example, in case of the Up-shift under Power ON condition, that is, in case of "Power ON Up-shift", the speed change process is carried out in such a manner as is depicted by the time chart of FIG. 5. That is, as is seen from the time chart, at first, there is produced a preparation phase that lasts from a time when the shift change is commanded to a time when the change-over shift change by the engaging and disengaging side frictional elements is about to start.

In this preparation phase, preparation is so made that the engaging side frictional element is ready for starting the engaging operation for generation of torque. For this preparation, a pre-charge hydraulic pressure (which will be referred to an engaging side indicated pressure hereinafter) is fed or indicated to the engaging side frictional element and a so-called slip control is carried out to permit the stepwise variable transmission input rotation speed $Ni_{(AT)}$ to make a predetermined rotation slip. In this slip control, the torque distribution ratio of the disengaging side frictional element is made 1 (one) and the torque distribution ratio of the engaging side frictional element is made 0 (zero). For effecting this control, by adding the rotation slip part to the stepwise variable transmission input rotation speed $Ni_{(AT)}$ in a condition before the shift change, a target input rotation speed $N_{i(AT)}(0)$ of stepwise variable transmission section 9 is calculated, and the disengaging side frictional element is subjected to a feedback control.

After ending of the preparation phase, a so-called torque shifting is carried out by the distribution of the stepwise variable transmission input torque $T_{i(AT)}$ from the disengaging side frictional element to the engaging side frictional element. That is, a so-called torque phase starts. It is to be noted that the torque phase is defined by a period that extends from a time when, after issuance of the speed change command, the engaging side frictional element is about to have an actual working capacity to a time when the change of an actual transmission ratio starts.

Also in this torque phase, the above-mentioned slip control is carried out to permit the stepwise variable transmission input rotation speed $Ni_{(AT)}$ to make a predetermined rotation slip. In this slip control, by adding the rotation slip part to the stepwise variable transmission input rotation speed $Ni_{(AT)}$ in a condition before the shift change, a target input rotation speed $Ni_{(AT)}(0)$ of the stepwise variable transmission section 9 is calculated, and the disengaging side frictional element is subjected to a feedback control.

After ending of the torque phase, the stepwise variable transmission input rotation speed $Ni_{(AT)}$ changes from a speed established before the change-over shift change to a speed established after the change-over shift change. That is, a so-called inertia phase starts. It is to be noted that the inertia phase is defined by a period that extends from a time when the actual transmission ratio changes from the value established before the speed change (viz., torque phase ending time) to a time when the transmission ratio shows the value established after the speed change.

In this inertia phase, there is calculated a target stepwise variable transmission input rotation speed $Ni_{(AT)}(0)$ that causes the stepwise variable transmission input rotation speed $Ni_{(AT)}$ to change from the speed established before the shift change to the speed established after the shift change, and the engaging side frictional element is subjected to a feedback control. In this feedback control, the torque distribution ratio of the disengaging side frictional element is made 0 (zero) and the torque distribution ratio of the engaging side frictional element is made 1 (one). For effecting this control, a reference torque (which will be referred to engaging side indicated reference torque hereinafter) indicated to the engaging side frictional element is set to the stepwise variable transmission input torque $T_{i(AT)}$ and a reference torque (which will be referred to disengaging side indicated reference torque hereinafter) indicated to the disengaging side frictional element is set to 0 (zero).

In the inertia phase, the above-mentioned cooperative speed change control is carried out. This cooperative speed change control is started in synchronization with the starting of the inertial phase. Accordingly, in this invention, by effecting after-mentioned judgment of ending of the torque phase, the starting of the cooperative speed change control is synchronized with the starting of the inertia phase.

After ending of the inertia phase, the torque of the engaging side frictional element is increased to such a level that provides the stepwise variable transmission input torque $Ti_{(AT)}$ with a sufficient allowance. That is, a so-called finish phase is started. In this finish phase, the torque of the engaging side frictional element is slowly increased to such a value that provides the stepwise variable transmission input torque $T_{i(AT)}$ with a sufficient allowance, and the torque of the disengaging side frictional element is removed. For slowly increasing the torque of the engaging side frictional element, the engaging side indicated hydraulic pressure is controlled, and for removing the torque of the disengaging side frictional element, a hydraulic pressure (which will be referred to disengaging side indicated pressure hereinafter) indicated to the disengaging side frictional element is reduced to 0 (zero). With these actions, the "Power-ON Up-shift" is finished.

Figure 6:
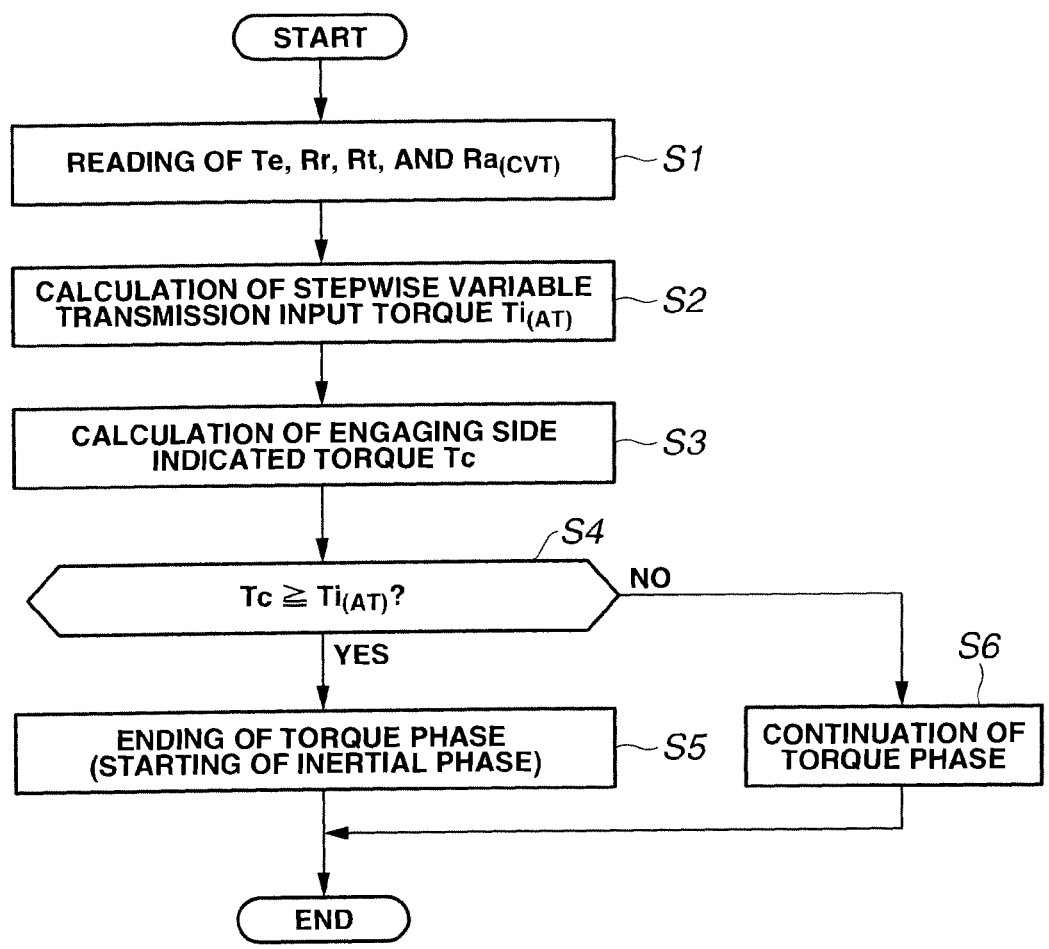
FIG. 6 is a flowchart of programmed operation steps that are carried out by the control system of the present invention for judging or detecting the starting of the inertia phase of the change-over shift change.

FIG. 6 shows a flowchart practically used for judging the ending of the torque phase, which is needed for carrying out the above-mentioned cooperative speed change control.

Programmed operation steps of the flowchart are executed in transmission controller (TC) 11. That is, based on an indicated value calculated in accordance with the judgment, solenoid valves in hydraulically controlling valve unit 10 are subjected to a duty control for carrying out the cooperative speed change control.

In the following, the flowchart of FIG. 6 will be described in detail.

The programmed operation steps of the flowchart are executed by using, for example, starting of shift change as a trigger. At step S1, for calculating the stepwise variable transmission input torque $T_{i(AT)}$ and a torque Tc (which will be referred to an engaging side indicated torque hereinafter) that is indicated to the engaging side frictional element, the engine torque Te, a reduction ratio Rr (which will be referred to speed reduction mechanism reduction ratio hereinafter) of speed reduction mechanism 3, a torque ratio Rt (which will be referred to a torque converter ratio hereinafter) of torque converter 2 and the continuously variable side ratio $Ra_{(CVT)}$ are read. Then, the operation flow goes to step S2.

At step S2, the stepwise variable transmission input torque $T_{i(AT)}$ is calculated. That is, at first, by using a known calculating method, an output torque (or turbine torque) $T_{o(tc)}$ (=Rt×Te) of torque converter 2 is derived from the engine torque Te and the torque converter ratio Rt. Then, by using the following equation (1):

Turbine torque $(T_{o(tc)})$×Reduction ratio $(Rr)$×Continuously variable transmission side ratio $(Ra_{(CVT)})$=Stepwise variable transmission input torque $(T_{i(AT)})$     (1)

the stepwise variable transmission input torque $T_{i(AT)}$ is derived. Actually, in the power train of FIG. 1, the turbine torque $T_{o(tc)}$ and the stepwise variable transmission input torque $T_{i(AT)}$ have therebetween a static relation like the above-mentioned equation (1). Then, the operation flow goes to step S3.

Figure 7:
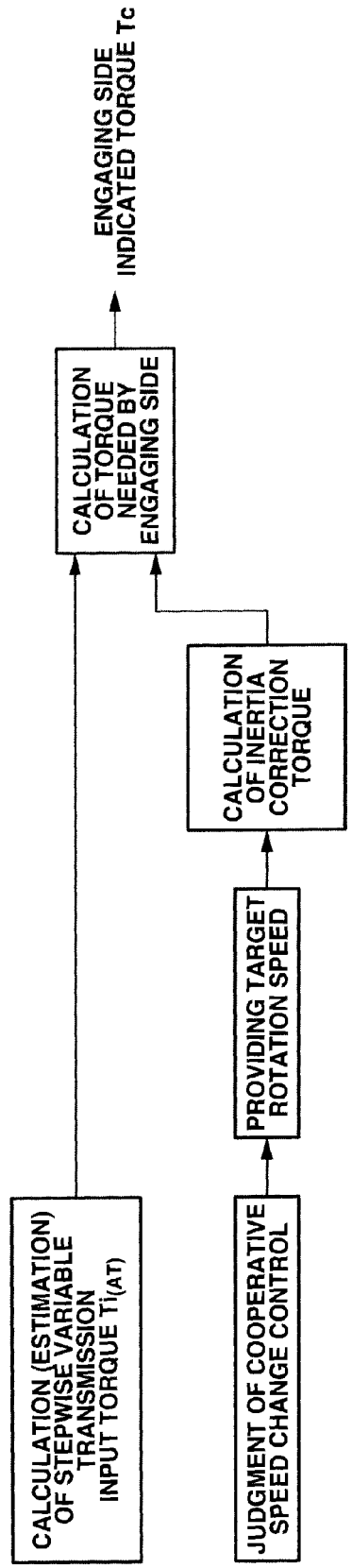
FIG. 7 is a block diagram that schematically shows control flows at the time of calculating an indicated torque directed to an engaging side frictional element that is to be engaged.

At step S3, a torque (which will be referred to an engaging side indicated torque hereinafter) $T_c$ indicated to the engaging side frictional element is calculated in such a way as is shown in a control flow of FIG. 7. In the control of FIG. 7, the stepwise variable transmission input torque $T_{i(AT)}$ (see step S2 of the flowchart of FIG. 6) is calculated and judgment is carried out as to whether a cooperative speed change control is present or not.

That is, when a change-over shift change is carried out in the stepwise variable transmission section 9, it is judged that there is a need of the cooperative speed change control. Upon this, a control for controlling the stepwise variable transmission input rotation speed $N_{i(AT)}$ to a speed in accordance with the change-over shift change is carried out. For this control, a target stepwise variable transmission input rotation speed $N_{i(AT)}(0)$ is derived and then, a correction torque that is needed by the engaging side frictional element (viz., high clutch H/C) in the inertia phase for assuredly controlling the stepwise variable transmission input rotation speed $N_{i(AT)}$ is calculated.

Thus, by multiplying the stepwise variable transmission input torque $T_{i(AT)}$ by an allotted rate of the torque needed by the engaging side frictional element in the inertia phase, an allotted torque needed by the engaging side frictional element in the inertia phase is derived, and by correcting this allotted torque for the engaging side frictional element with the above-mentioned correction torque, the engaging side indicated torque $T_c$ is calculated.

If the engaging side indicated torque $T_c$ is of a type that assures an exact control of the stepwise variable transmission input rotation speed $N_{i(AT)}$ in the inertia phase, there is no need of deriving the correction torque for the inertia phase. That is, in such case, an allotted torque needed by the engaging side frictional element in the inertial phase can be used as the engaging side indicated torque $T_c$ without making correction thereto.

Referring back to the flowchart of FIG. 6, at step S4, judgment is carried out as to whether a delivery of torque from the disengaging side frictional element to the engaging side frictional element is completed or not during the change-over shift change of the stepwise variable transmission section 9. More concretely, judgment is carried out as to whether the engaging side indicated torque $T_c$ is larger than the stepwise variable transmission input torque $T_{i(AT)}$ or not.

When it is judged that the engaging side indicated torque $T_c$ is larger than the stepwise variable transmission input torque $T_{i(AT)}$, that is, when it is judged that the delivery of torque from the disengaging side frictional element to the engaging side frictional element is completed, the operation flow goes to step S5 regarding that the torque phase has been ended. Upon this, it is judged that the inertia phase has started.

While, when it is judged that the engaging side indicated torque $T_c$ is not larger than the stepwise variable transmission input torque $T_{i(AT)}$, that is, when it is judged that the delivery of torque from the disengaging side frictional element to the engaging side frictional element is not completed, the operation flow goes to step S6 regarding that the torque phase has not been ended. In such case, it is judged that the inertia phase has not started yet.

It is to be noted that as is described in the block of step S5 the judgment of the completion of delivery of torque from the disengaging side frictional element to the engaging side frictional element means judgment of starting of the inertia phase.

Once the starting of the inertial phase is judged, the control of the continuously variable transmission section 8 is started. More specifically, controlling the continuously variable transmission section 8 is started in synchronization with the judgment. That is, upon judgment of starting of the inertial phase, the engaging side indicated hydraulic pressure Pc and the disengaging side indicated pressure Pr are controlled in such a manner that the speed change control for the continuously variable transmission section 8 is started in synchronization with the judgment.

It is to be noted that in the present invention, the actual working capacity of the frictional element can use a hydraulic pressure in place of the above-mentioned torque.

Figure 8:
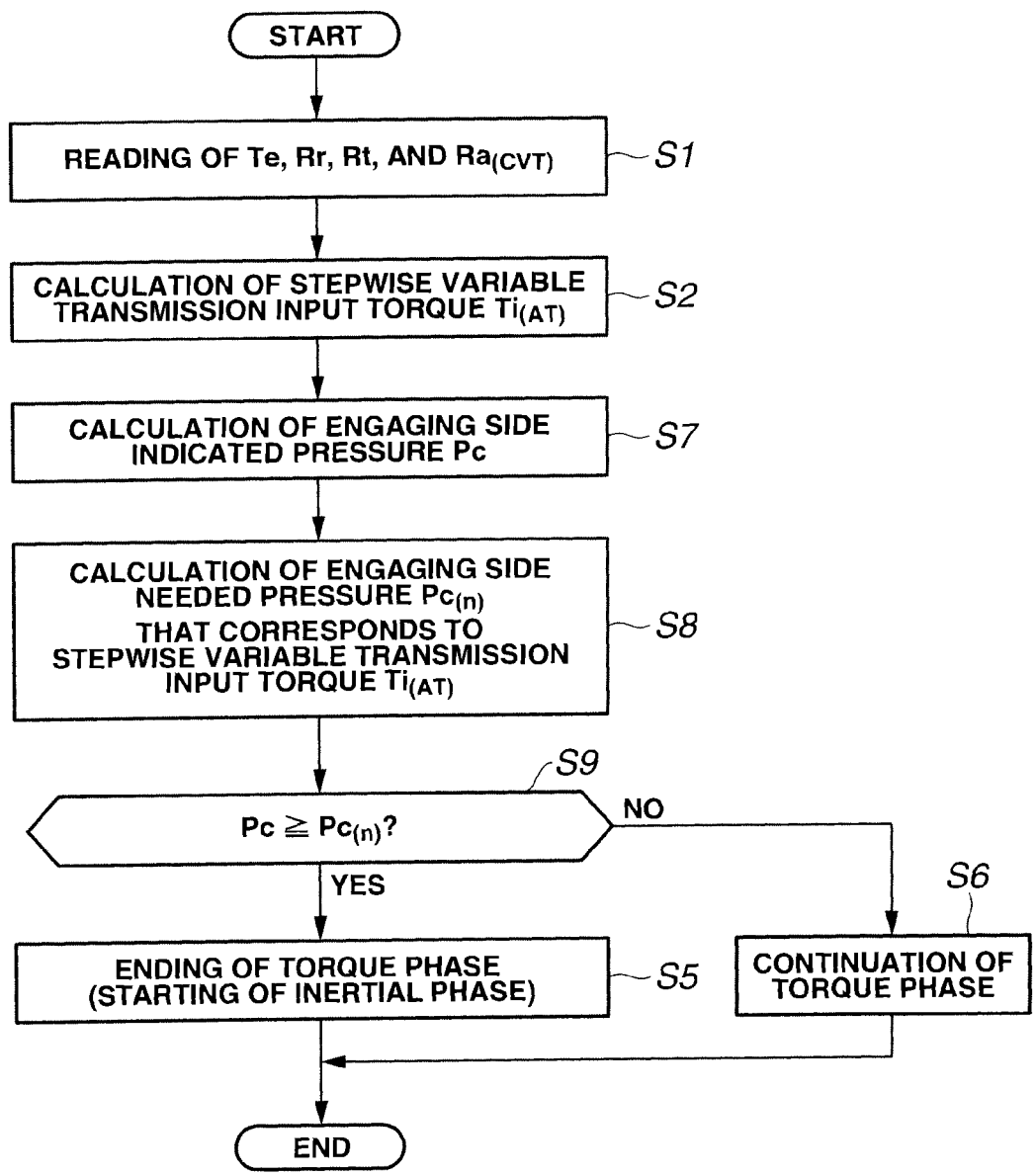
FIG. 8 is a flowchart similar to FIG. 6, but showing a modification of the programmed operation steps executed by the control system of the present invention for judging or detecting the starting of the inertia phase of the change-over shift change.

FIG. 8 shows a flowchart practically used for judging ending of the torque phase based on the hydraulic pressure, that is, an engaging side indicated pressure.

At step S1, like the step S1 of the flowchart of FIG. 6, the engine torque Te, the speed reduction mechanism reduction ratio Rr, the torque converter ratio Rt and the continuously variable side ratio $Ra_{(CVT)}$ are read.

At step S2, like the step S2 of the flowchart of FIG. 6, the stepwise variable transmission input torque $T_{i(AT)}$ is calculated.

Then, at step S3, an engaging side indicated pressure Pc is calculated. For this calculation, the control flow of FIG. 7 is used. That is, by using the flow of FIG. 7, the engaging side indicated torque $T_c$ is derived, and then this engaging side indicated torque $T_c$ is converted to a corresponding hydraulic pressure (viz., engaging side indicated pressure) needed by the engaging side frictional element.

Referring back to the flowchart of FIG. 8, at step S8, a hydraulic pressure $P_{c(n)}$ needed by the engaging side frictional element, which corresponds to the stepwise variable transmission input torque $T_{i(AT)}$, is calculated. The hydraulic pressure $P_{c(n)}$ will be referred to an engaging side needed pressure hereinafter. That is, by converting the stepwise variable transmission input torque $T_{i(AT)}$ to a corresponding hydraulic pressure, the engaging side needed pressure $P_{c(n)}$ is derived.

At step S9, like in the step S4 of the flowchart of FIG. 6, judgment is carried out as to whether a delivery of torque from the disengaging side frictional element to the engaging side frictional element is completed or not during the change-over shift change of the stepwise variable transmission section 9. More concretely, judgment is carried out as to whether the engaging side indicated pressure Pc is larger than the engaging side needed pressure $P_{c(n)}$ or not. That is, in case of the flowchart of FIG. 8, hydraulic pressure used as a parameter.

When it is judged that the engaging side indicated pressure Pc is larger than the engaging side needed pressure $P_{c(n)}$, that is, when it is judged that the delivery of torque from the disengaging side frictional element to the engaging side frictional element is completed, the operation flow goes to step S5 regarding that the torque phase has been ended. Upon this, it is judged that the inertia phase has started.

While, when it is judged that the engaging side indicated pressure Pc is not larger than the engaging side needed pressure $P_{c(n)}$, that is, when it is judged that the delivery of the stepwise variable transmission input torque $T_{i(AT)}$ from the disengaging side frictional element to the engaging side frictional element is not completed, the operation flow goes to step S6 regarding that the torque phase has not been ended. In such case, it is judged that the inertia phase has not started yet.

In this embodiment of the invention, in synchronization with the above-mentioned judgment, the cooperative speed change control to the continuously variable transmission section 8 is started.

Figure 9A:
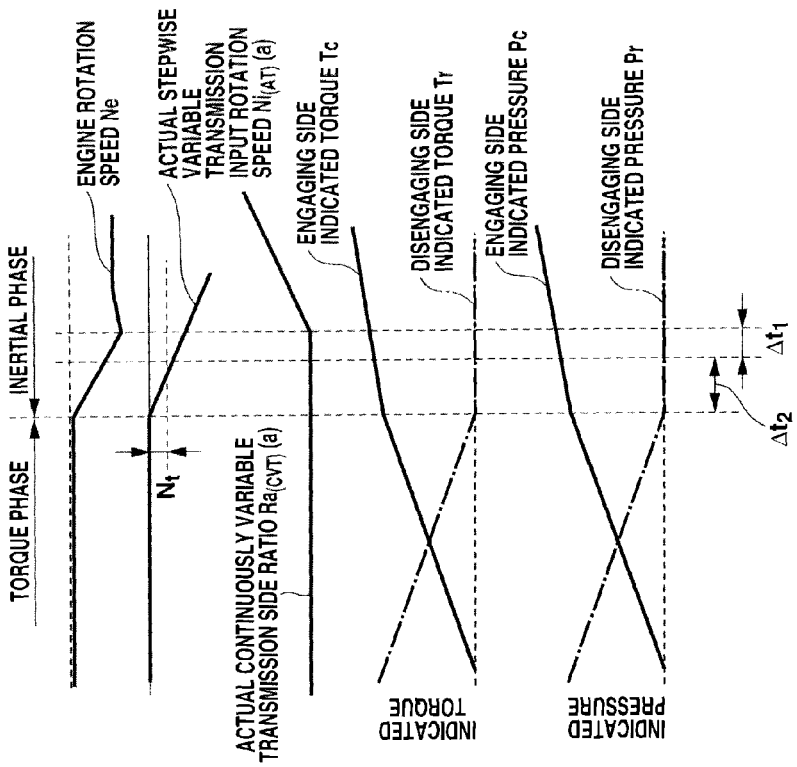
Figure 9B:
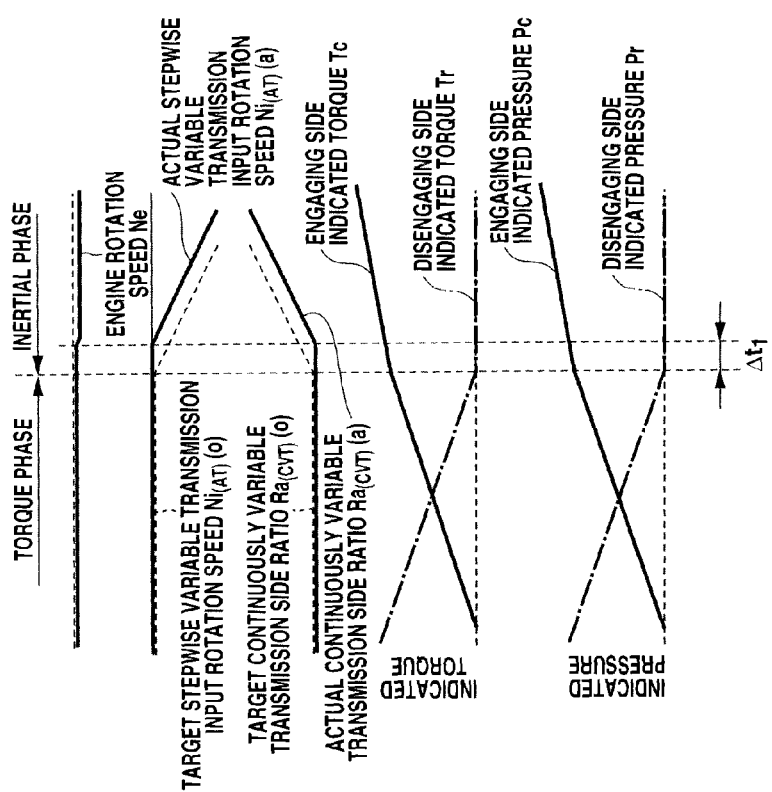

Referring to FIGS. 9A and 9B, there are shown time charts that are respectively provided by the present invention and a comparison example. That is, the time chart of FIG. 9A depicts the cooperative speed change control that is carried out upon judgment of starting of the inertia phase in accordance with the present invention, and the time chart of FIG. 9B depicts a cooperative speed change control that is carried out upon judgment of starting of the inertia phase in accordance with the comparison example, that is, the judgment based on the stepwise variable transmission input rotation speed $Ni_{(AT)}$.

As is seen from the time chart of FIG. 9A, in case wherein the judgment of the starting of the inertia phase is carried out based on whether the delivery of the input torque from the disengaging side frictional element to the engaging side frictional element is completed or not, there is produced a delay in timing between the time when the starting of the inertia phase is judged and the time when the continuously variable transmission section 8 actually starts the speed change. However, as is seen from the time chart of FIG. 9A, such delay is only a delayed time (or control time lug) $\Delta t_1$ that is permissible when controlling hardware.

While, as is seen from the time chart of FIG. 9B, in case of the comparison example wherein the judgment is based on the stepwise variable transmission input rotation speed $N_{i(AT)}$, that is, for example, in case wherein the judgment of the starting of the inertia phase is carried out based on whether the stepwise variable transmission rotation speed has reduced to a predetermined threshold value $N_t$ or not, the delay in timing is forced to exhibit a level that includes the permissible delayed time $\Delta t_1$ and a time $\Delta t_2$ that is needed until the stepwise variable transmission input rotation speed $N_{i(AT)}$ is reduced to the threshold value $N_t$.

Figure 10:
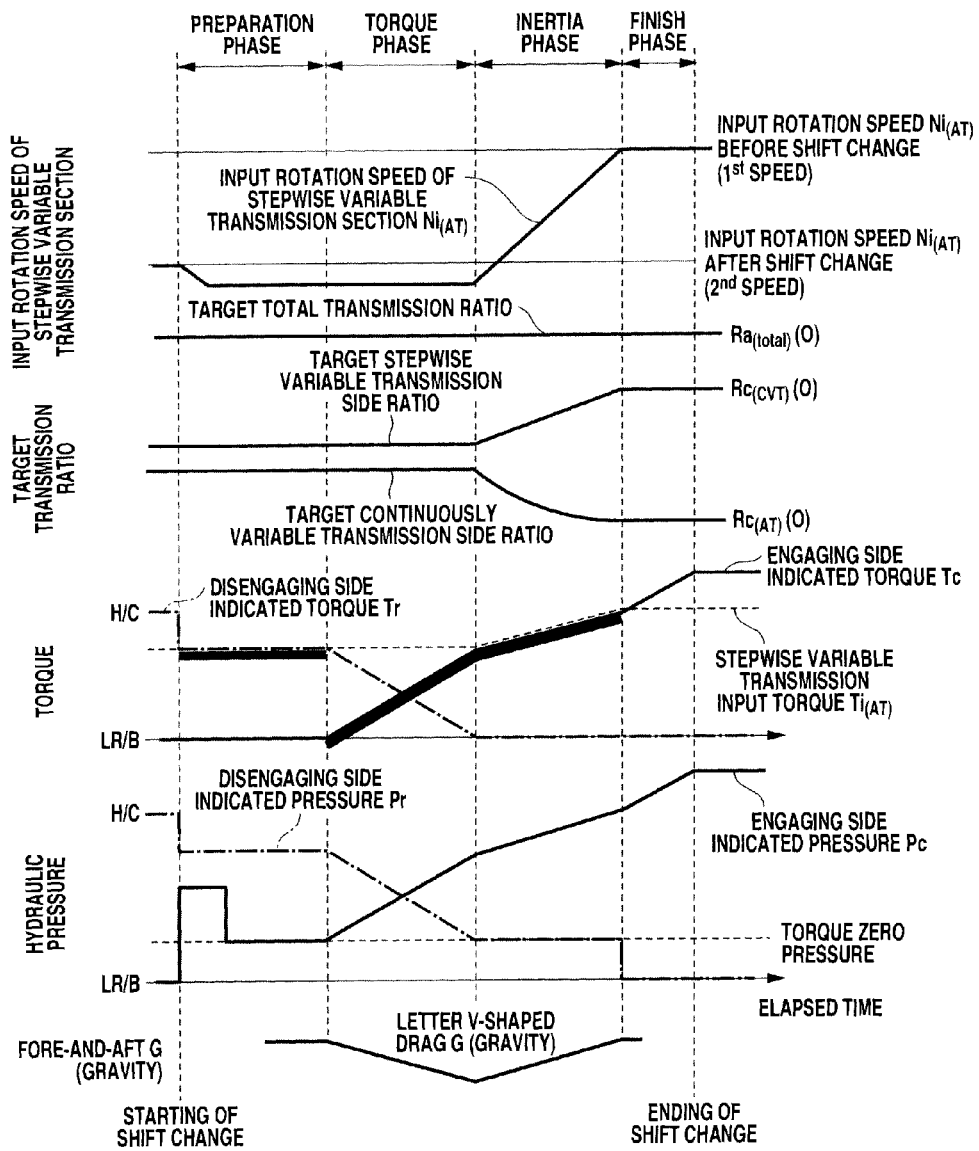
FIG. 10 is a time chart similar to that of FIG. 5, but showing a case in which "Power OFF Down-shift" operation is carried out.

Referring to FIG. 10, there is shown a time chart that depicts a case of the "Power Off Down-shift" wherein a down shift is carried out under a power off state. In this case, the control flow of the flowcharts of FIGS. 6 and 8 is carried out using the low & reverse brake LR/B as the engaging side frictional element and the high clutch H/C as the disengaging side frictional element, as shown. That is, as to the judgment of starting of the inertial phase, there is no substantial difference between the above-mentioned "Power ON Up-shift" and the "Power Off Down-shift".

As has been described hereinabove, in the present invention, attention is paid to the relation between a torque of the engaging side frictional element and that of the disengaging side frictional element. By embodying the relation, during the change-over shift change of the stepwise variable transmission section 9, the starting of controlling the continuously variable transmission section 8 is synchronized with the starting of the inertia phase of the change-over shift change. Accordingly, the starting of the cooperative speed change control is timed between the operation of the stepwise variable transmission section 9 and that of the continuously variable transmission section 8. Accordingly, in the present invention, undesired shift shock, that would be caused by the change of the automatic transmission input rotation speed $N_i$ (or the stepwise variable transmission input rotation speed $N_{i(AT)}$), can be suppressed or at least minimized.

Furthermore, as has been described in the section of the flowcharts of FIGS. 6 and 8, when an actual working capacity (viz., torque or hydraulic pressure) of the engaging side frictional element becomes larger than a predetermined value, it is judged that the delivery of torque from the disengaging side frictional element to the engaging side frictional element is completed. With such judgment, the starting of the inertia phase can be accurately judged and detected.

If desired, the predetermined value may be a value that provides input and output portions of the engaging side frictional element with equal torque. That is, in accordance with the stepwisely variable transmission input torque $T_{i(AT)}$, various values are previously set that provide the input and output portions with equal torque, and one of the values is suitably picked out as a predetermined value for use in a needed judgment. Also in this case, the completion of the delivery of the torque from the disengaging side frictional element to the engaging side frictional element can be accurately detected. In other words, the starting of the inertia phase can be accurately detected. Accordingly, undesired shift shock, that would be caused by the change of the automatic transmission input rotation speed $N_i$, can be effectively suppressed or at least minimized.

As has been described in the section of the flowchart of FIG. 6, when the above-mentioned actual working capacity is set to the indicated torque that manages engagement and disengagement of the engaging side frictional element, the completion of the delivery of torque from the disengaging side frictional element to the engaging side frictional element, that is, the starting of the inertia phase, can be accurately detected. Accordingly, also in this case, undesired shift shock, that would be caused by the change of the automatic transmission input rotation speed $N_i$, can be effectively suppressed or at least minimized.

As is seen from the flowchart of FIG. 6, by setting the predetermined value to the stepwise variable transmission input torque $T_{i(AT)}$, simple operation steps, such as step S1 and step S2, can be used. That is, by using such simple steps, a known processing method in a power transmission system can be used for deriving the most up-to-date predetermined value.

As has been described in the section of the flowchart of FIG. 8, when the actual working capacity is set to the indicated hydraulic pressure that manages engagement and disengagement of the engaging side frictional element, the completion of the delivery of torque from the disengaging side frictional element to the engaging side frictional element, that is, the starting of the inertia phase, can be accurately detected. Thus, also in this case, undesired shift shock, that would be caused by the change of the automatic transmission input rotation speed $N_i$, can be effectively suppressed or at least minimized.

Furthermore, as is seen from FIG. 1 and has been described in the sections of the flowcharts of FIGS. 6 and 8, when the present invention is practically applied to the unit in which the output side of the continuously variable transmission section 8 is connected in series to the input side of the stepwise variable transmission section 9, the stepwise variable transmission input torque $T_{i(AT)}$ can be effectively calculated from the drive side by processing the engine torque Te, the speed reduction mechanism reduction ratio Rr, the torque converter ratio Rt and the continuously variable side ratio $Ra_{(CVT)}$, which are all previously set. Of course, such information data Te, Rr, Rt and $Ra_{(CVT)}$ can be directly or indirectly provided.

As is known the ON/OFF condition of power (viz., Power ON or Power Off) can be judged or detected based on movement of an accelerator pedal controlled by a driver.

While, the frictional element, such as clutch or brake installed in the stepwise variable transmission section 9, has such a function that when it is engaged, input and output portions of the frictional element show an equal rotation speed. In the invention, such function is practically used.

That is, in the invention, from the change of the input rotation speed of the stepwise variable transmission section 9, switching of the Power ON/OFF condition is judged or detected.

Figure 11A:
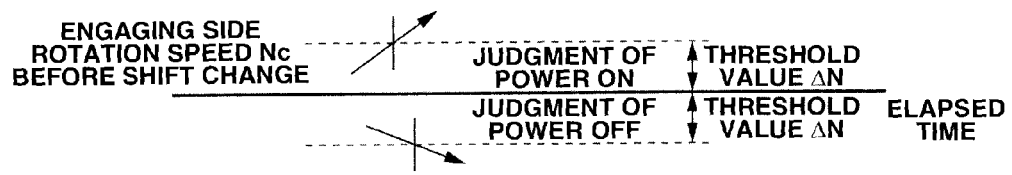
FIGS. 11A and 11B are time charts respectively showing a method of judging "Power ON/OFF condition" at the time when the stepwise variable transmission section is under non speed changing or under a preparation phase and a method of judging "Power ON/OFF condition" at the time when the stepwise variable transmission section is under a torque phase or an inertia phase.

More specifically, as is seen from FIG. 11A, when, under a non shift changing wherein the change-over shift change is not carried out in the stepwise variable transmission section 9 or under the preparation phase that takes place before the torque and inertia phases once the change-over shift change is carried out, the automatic transmission input rotation speed Ni increases to a value higher than the engaging side rotation speed Nc of the frictional element (viz., low & reverse brake LR/B or high clutch H/C) of the stepwise variable transmission section 9 by a predetermined threshold value $\Delta N$, judgment of "Power ON" is made. While, when, under the above-mentioned non shift changing state or preparation phase, the automatic transmission input rotation speed Ni decreases to a value smaller than the engaging side rotation speed Nc of the frictional element by a predetermined threshold value $\Delta N$, judgment of "Power OFF" is made.

Figure 11B:
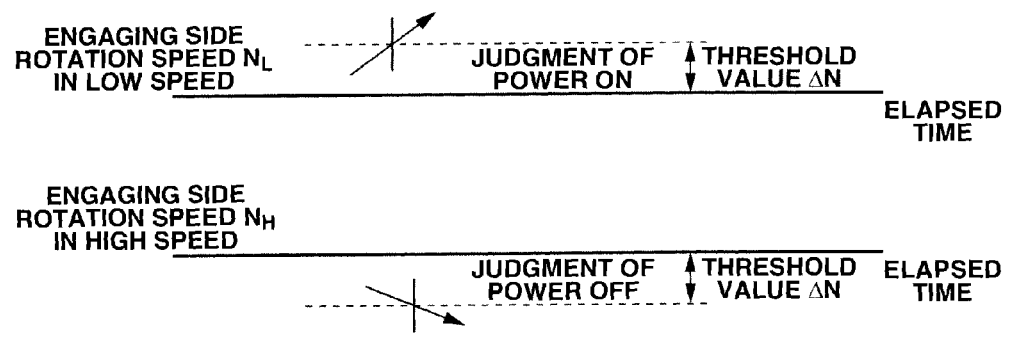

While, as is seen from FIG. 11B, when, under the torque phase or the inertial phase during which the shift change is actually carried out, the automatic transmission input rotation speed Ni increases to a value higher than the engaging side rotation speed $N_{c(Low)}$ of the frictional element (viz., low & reverse brake LR/B) in a low speed of the stepwise variable transmission section 9 by a predetermined threshold value $\Delta N$, judgment of "Power ON" is made. While, when, under the above-mentioned phase, the automatic transmission input rotation speed Ni decreases to a value smaller than the engaging side rotation speed $N_{c(High)}$ of the frictional element (viz., high clutch H/C) in a high speed of the stepwise variable transmission section 9 by a predetermined threshold value $\Delta N$, judgment of "Power OFF" is made. Such Power ON/OFF judgment is executed by the transmission controller (TC) 11.

When, as is mentioned hereinabove, switching of the Power ON/OFF condition is judged based on the change of the input rotation speed of the stepwise variable transmission section 9, the Power ON/OFF condition can be accurately judged even if the torque inputted from the drive side, such as engine 1, to the stepwise variable transmission section 9 is very small (almost zero). Of course, the threshold value $\Delta N$ may be changed in accordance with need by a driver or the type of an associated motor vehicle. That is, with such change, undesired slip of the low & reverse brake LR/B and the high clutch H/C is accurately judged and the threshold value $\Delta N$ may have a small value (for example, 20 to 50 rpm).

The stepwise variable transmission section 9 employed in the above-mentioned embodiment is of a type that establishes a forward $1^{st}$ speed, a forward $2^{nd}$ speed and a reverse. However, if desired, the stepwise variable transmission section 9 may be of a type that has three or more forward speeds.

The entire contents of Japanese Patent Application 2009-054008 filed Mar. 6, 2009 are incorporated herein by reference.

Although the invention has been described above with reference to embodiments of the invention, the invention is not limited to such embodiments as described above. Various modifications and variations of such embodiments may be carried out by those skilled in the art, in light of the above description.

What is claimed is:

1. A control system of an automatic transmission, the automatic transmission including a stepwise variable transmission section that includes a plurality of frictional elements and establishes a desired speed by a shift change disengaging one of the plurality of frictional elements and engaging another of the plurality of frictional elements and a continuously variable transmission section that establishes a desired speed continuously, the control system making a speed change control of the continuously variable transmission section cooperate with a change of an input rotation speed of the stepwise variable transmission section, the control system configured to:
judge, during the shift change of the stepwise variable transmission section, whether a delivery of a torque from one of a plurality of disengaging side frictional elements to one of a plurality of engaging side frictional elements is completed; and
start the speed change control of the continuously variable transmission section upon judgment that the delivery of the torque is completed and that an inertial phase has started.

2. A control system of an automatic transmission as claimed in claim 1, in which the control system is configured to judge completion of the delivery of the torque when an actual working capacity of one of the plurality of engaging side frictional elements exceeds a predetermined value.

3. A control system of an automatic transmission as claimed in claim 2, in which the predetermined value is a value that provides input and output portions of the plurality of engaging side frictional elements with equal torque.

4. A control system of an automatic transmission as claimed in claim 2, in which the actual working capacity is a torque that manages engagement and disengagement of the plurality of engaging side frictional elements.

5. A control system of an automatic transmission as claimed in claim 4, in which the predetermined value is an input torque of the stepwise variable transmission section.

6. A control system of an automatic transmission as claimed in claim 5, in which the continuously variable transmission section is arranged on an input side of the stepwise variable transmission section.

7. A control system of an automatic transmission as claimed in claim 2,
wherein the actual working capacity is a hydraulic pressure that is indicated to one of the plurality of frictional elements for selective engagement and disengagement.

8. A control system of an automatic transmission as claimed in claim 1,
wherein an actual working capacity is a hydraulic pressure that is indicated to one of the plurality of engaging side frictional elements for managing engagement and disengagement.

9. A control system of an automatic transmission as claimed in claim 1, in which each of the plurality of frictional elements of the stepwise variable transmission section takes an engaged condition or a disengaged condition in accordance with a magnitude of hydraulic pressure practically applied thereto.

10. A control system of an automatic transmission, the automatic transmission including a stepwise variable transmission section that includes a plurality of frictional elements and establishes a desired speed by a shift change disengaging one of the plurality of frictional elements and engaging another of the plurality of frictional elements and a continuously variable transmission section that establishes a desired speed continuously, the control system making a speed change control of the continuously variable transmission section cooperate with a change of an input rotation speed of the stepwise variable transmission section, the control system comprising:
means for judging, during the shift change of the stepwise variable transmission section, whether a delivery of a torque from one of a plurality of disengaging side frictional elements to one of a plurality of engaging side frictional elements is completed; and
means for starting the speed change control of the continuously variable transmission section upon judgment that the delivery of the torque is completed and that an inertial phase has started.

11. A method of controlling an automatic transmission, the automatic transmission including a stepwise variable transmission section that includes a plurality of frictional elements and establishes a desired speed by a shift change disengaging one of the plurality of frictional elements and engaging another of the plurality of frictional elements and a continuously variable transmission section that establishes a desired speed continuously, the continuously variable transmission section being controlled in cooperation with a change of an input rotation speed of the stepwise variable transmission section, the method comprising:
judging, in a transmission controller, during the shift change of the stepwise variable transmission section, whether a delivery of a torque from one of a plurality of disengaging side frictional elements to one of a plurality of engaging side frictional elements is completed; and
starting, in a transmission controller, control of the continuously variable transmission section upon judgment that the delivery of the torque is completed and that an inertial phase has started.

* * * * *